United States Patent [19]
Jeanneret

[11] Patent Number: 5,402,046
[45] Date of Patent: Mar. 28, 1995

[54] VEHICLE DRIVE SYSTEM
[75] Inventor: René Jeanneret, Merzligen, Switzerland
[73] Assignee: SMH Management Services AG, Biel, Switzerland
[21] Appl. No.: 81,691
[22] Filed: Jun. 25, 1993
[30] Foreign Application Priority Data
  Jul. 1, 1992 [CH] Switzerland .................. 02073/92
[51] Int. Cl.⁶ ............................................. B60L 11/12
[52] U.S. Cl. .................................... 318/139; 180/65.4
[58] Field of Search ....................... 318/139, 140, 803;
    180/65.1, 65.3, 65.4; 290/8, 9, 10, 11, 14, 16, 17, 45, 50

[56] References Cited
U.S. PATENT DOCUMENTS 3,837,419  9/1974  Nakamura .
4,199,037  4/1980  White .
4,306,156 12/1981  Monaco et al. .
4,306,179 12/1981  Whitford .
4,371,824  2/1983  Gritter ............................ 318/722
5,115,183  5/1992  Kyoukane et al. ................ 320/61
5,162,707 11/1992  Joseph .

FOREIGN PATENT DOCUMENTS 4116899 11/1991 Germany .
WO86/06009 10/1986 WIPO .
WO92/08278  5/1992 WIPO .

Primary Examiner—Bentsu Ro
Attorney, Agent, or Firm—Pollock, Vande Sande & Priddy

[57] ABSTRACT

The vehicle drive system has an asynchronous motor mechanically coupled to a wheel of the vehicle, a rechargeable accumulator, a first converter interposed between the rechargeable accumulator and the motor and arranged so as to regulate the electric power supplied to the motor and a generator driven by an internal combustion engine, as well as a control circuit. To make it possible to recharge the accumulator under optimum conditions, the system also has a second converter arranged so as to regulate the power supplied by the generator to the accumulator and to the first converter.

3 Claims, 1 Drawing Sheet

VEHICLE DRIVE SYSTEM

FIELD OF THE INVENTION

The instant invention relates to a drive system for a vehicle having at least one drive wheel and means for producing a signal for controlling the speed of rotation of said drive wheel, comprising:
  an electric motor mechanically coupled to said drive wheel;
  a rechargeable electric energy accumulator;
  an internal combustion engine;
  an electric energy generator mechanically coupled to said internal combustion engine;
  electric energy transfer means electrically connected to said electric motor, to said generator and to said accumulator to cause a first electric energy flux to pass between said accumulator and said electric motor, a second electric energy flux to pass between said generator and said electric motor and a third electric energy flux to pass between said generator and said accumulator; and
  means for producing a first measurement signal representative of the amount of electric energy stored in said accumulator.

DESCRIPTION OF THE PRIOR ART

U.S. Pat. No. 4,306,156 for example describes a system of this type in which the drive wheels of the vehicle are connected to an alternating current electric drive motor via the intermediary of a vehicle speed regulating device having a hydraulic couple convertor and an automatic gear box controlled, among others, by the accelerator pedal of the vehicle.

The alternating supply voltage of the electric drive motor is provided by a converter circuit which receives a direct voltage from a rechargeable battery, as long as the amount of energy available in this latter is greater than a given amount.

When this amount of available energy in the battery falls below this threshold, a control circuit comprising, among others, a computer triggers the starting up of a gasoline engine mechanically coupled to a direct voltage generator and the connection of this generator to the converter and to the battery. This gasoline engine then supplies, via the intermediary of the generator, the energy needed to drive the vehicle and recharge the battery.

When the amount of electric energy available in the battery again exceeds the predetermined threshold, the control circuit stops the gasoline engine and disconnects the generator. The energy needed to drive the vehicle is then once again supplied by the battery.

In this system, the voltage and the current supplied by the generator when the gasoline engine operates are substantially constant. A first part of this current serves to feed the drive motor, via the intermediary of the converter circuit, and the second part of this current serves to recharge the battery. If the drive motor consumes little or no energy, for example when the vehicle runs downhill or when it is at rest, this second part of the current supplied by the generator can be relatively high. However, it is known that a battery may not be charged by a current greater than a determined value under penalty of being damaged. The system described hereinabove thus has a resistance connected in series between the generator and the battery and which is designed to limit the charging current of the latter.

This resistance wastes a considerable amount of energy which substantially reduces the efficiency of the system. In addition, this resistance needs to be of considerable size and its temperature can reach high values, which makes it complicated to install it in the vehicle. What is more, despite the presence of this resistance, the battery charging conditions are not favourable because of considerable variations in the current used for this charge, which can reduce the life of this battery.

OBJECTS OF THE INVENTION

It is an object of the instant invention to provide a vehicle drive system of the same type as that described in U.S. Pat. No. 4,306,156 but which does not have the above-described disadvantages of the latter, that is a system the efficiency of which is substantially better than that of this known system, which has no cumbersome component having possibly a very high temperature such as the limitation resistance mentioned hereinabove, and in which the battery charging conditions can be close to optimum conditions.

BRIEF SUMMARY OF THE INVENTION

This object is achieved by the claimed system, which is a drive system for a vehicle having at least one drive wheel and means to produce a signal for controlling the speed of rotation of said drive wheel and which has:
  an electric motor mechanically coupled to said drive wheel;
  a rechargeable electric energy accumulator;
  an internal combustion engine;
  an electric energy generator mechanically coupled to said internal combustion engine;
  electric energy transfer means electrically connected to said electric motor, to said generator and to said accumulator to cause a first electric energy flux to pass between said accumulator and said electric motor, a second electric energy flux to pass between said generator and said electric motor, and a third electric energy flux to pass between said generator and said accumulator; and
  means to produce a first measurement signal representative of the amount of electric energy stored in said accumulator;
  this system being characterized in that said electric energy transfer means have:
  first regulating means to regulate the intensity of said first and of said second electric energy flux in response to a first regulating signal; and
  second regulating means to regulate the intensity of said second and of said third electric energy flux in response to a second regulating signal;
  and in that said system also has:
  means to produce a second measurement signal representative of the electric power transmitted by said first and said second electric energy flux;
  means to produce a third measurement signal representative of the electric power transmitted by said second and said third electric energy flux; and
  a control circuit arranged so as to produce said first regulating signal as a function of said control signal and to produce said second regulating signal as a function of the difference between said third and said second measurement signals.

BRIEF DESCRIPTION OF THE DRAWINGS

Other objects and advantages of the instant invention will be apparent from the following description with reference to the appended drawing in which the single

DETAILED DESCRIPTION OF THE INVENTION

Figure 1:
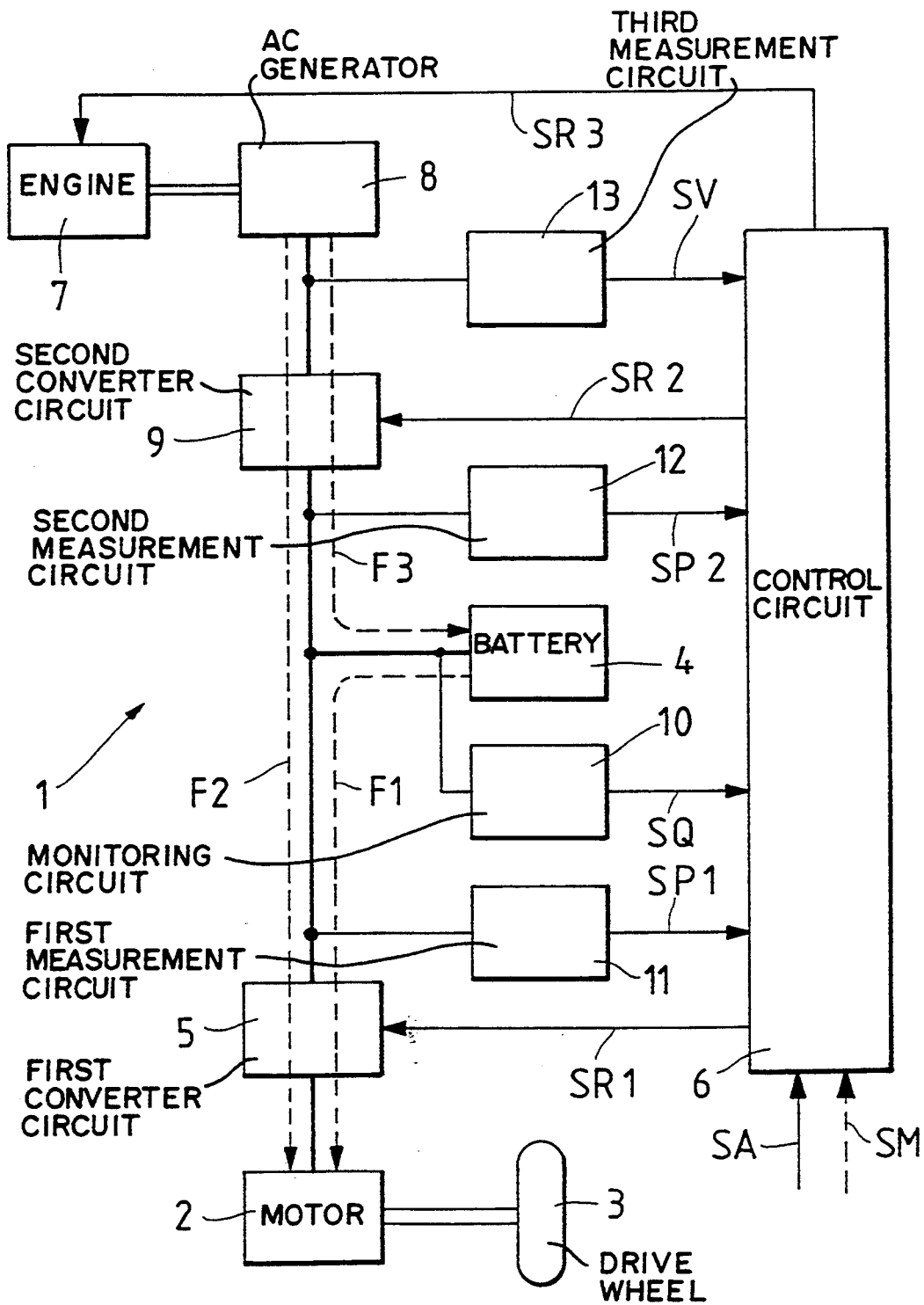
FIG. 1 is a block diagram representing two embodiments of the drive system of the instant invention which will only be described by way of non-limiting examples.

The vehicle drive system shown diagrammatically in FIG. 1, in which it bears the reference numeral 1, has an asynchronous motor 2, the rotor of which, not shown separately, is mechanically connected to a drive wheel of the vehicle, also shown in this FIG. 1 with the reference numeral 3. In this FIG. 1, the motor 2 and the wheel 3 are separate, their mechanical connection being represented by a double line. It is, however, clear that this motor 2 and this wheel 3 can be mounted together or that they can be connected via the intermediary of a transmission shaft and/or by a gear train.

The system 1 also has a rechargeable electric energy accumulator, or battery, 4 which is connected to the stator of the motor 2, not shown separately, via the intermediary of a first converter circuit 5. This converter 5 is so disposed as to be able to supply the electric energy needed for the functioning of the motor 2 in the form of alternating voltage and current from the electric energy which it receives from the battery 4, or from other circuits which will be described hereinbelow, in the form of direct voltage and current.

The converter circuit 5 is moreover disposed-so as to regulate the voltage and/or the current which it supplies to the motor 2 as well as, possibly, the frequency of this voltage and of this current, in response to a regulating signal designated SR1, which it receives from a control circuit 6, the functions of which will be described hereinafter. In other words, the converter 5 is arranged so as to regulate the electric power which it supplies to the motor 2 in response to the regulating signal SR1.

It should be noted here that the electrical connections between the various elements that have just been described or which will be described hereinbelow are represented in FIG. 1 by a single line even though these connections are composed of several conducting wires as is of course the case notably for the connections between the battery 4, the converter 5 and the motor 2. To make this FIG. 1 easier to understand, the connections involving the transmission of electric energy have been represented by lines thicker than those which serve to transmit control or measurement signals.

The system 1 also has a gasoline engine 7 mechanically coupled to the rotor, not shown separately, of an alternating voltage generator 8. In this FIG. 1, the engine 7 and the generator 8 are separate, their mechanical connection being represented by a double line. It is, however, clear that this engine 7 and this generator 8 can be mounted together or that they can be connected via the intermediary of a gear train.

The stator of the generator 8, not shown separately, is connected to the battery 4, and thus to the converter 5, via the intermediary of a second converter circuit 9. This converter 9 is disposed so as to supply, from the alternating voltage produced by the generator 8, a direct voltage substantially equal to the voltage produced by the battery 4. This converter 9 is, moreover, so disposed as to regulate, in response to a second regulating signal designated SR2, the current and thus the power which it supplies to the battery 4 and to the converter 5. The signal SR2 is produced by the control circuit 6 in a manner that will be described hereinbelow.

The system 1 also has a monitoring circuit 10, the inputs of which are connected to the battery 4 and which is disposed so as to supply to the control circuit 6 a signal designated SQ, proportional to the amount of electric energy available in this battery 4. This monitoring circuit 10 will not be described in detail since it can be made in different ways which are well known to the person skilled in the art. It will only be mentioned that this monitoring circuit 10 generally has measurement circuits supplying signals representative of the voltage at the terminals of the battery 4, of the charging or discharging current of this latter as well as of its temperature. This circuit 10 also has the calculating circuits needed to produce the signal SQ in response to the various measurement signals mentioned hereinabove, possibly taking into account the age of the battery 4, that is the time which has elapsed since its first use.

It will be admitted in the present example that the circuit 10 is disposed so that the signal SQ varies between a maximum value when the battery 4 is completely charged and a zero value when this battery 4 is completely discharged.

The system 1 also has a first measurement circuit 11 connected to the converter 5 and arranged so as to produce and to supply to the control circuit 6 a measurement signal SP1 proportional to the electric power absorbed by this converter 5 and thus by the motor 2, as well as a second measurement circuit 12 connected to the converter 9 and arranged so as to produce and to supply to the control circuit 6 a measurement signal SP2 proportional to the electric power supplied by the converter 9 and thus by the generator 8.

The system 1 may also have a circuit designed to charge the battery 4 when the vehicle is at rest close to a source of electric energy such as a socket connected to a public electric energy supply network. A charging circuit of this kind has not been shown since it has no direct connection with the instant invention.

The control circuit 6 will not be described in detail since the person skilled in the art will have no difficulty in realizing it in the one or the other of the many possible ways after having read the following explanations of the operation of system 1.

It will simply be mentioned that, apart from the signals SQ, SP1 and SP2 already mentioned, the circuit 6 receives a control signal SA representative of the position of the accelerator pedal of the vehicle. This signal SA can be supplied, for example, by a potentiometer, the cursor of which is mechanically connected to this accelerator pedal. This pedal and this potentiometer have not been shown.

It should also be mentioned that the fuel supply device of the gasoline engine 7, which has for example a carburettor or an injection pump, is arranged so as to regulate this fuel supply in response to a regulating signal SR3 supplied by the control circuit 6 in conditions to be described hereinbelow.

It will be admitted that, at the moment at which this description of the functioning of the drive system 1 commences, the amount of electric energy available in the battery 4 is greater than a determined amount Q1 and that the value of the signal SQ is thus greater than a value SQ1 corresponding to this amount of energy Q1.

The fact that the value of the signal SQ is greater than this value SQ1 means that the control circuit 6 produces the regulating signal SR3 with a value such that the supply to the gasoline engine 7 is completely interrupted. This engine 7 is thus at rest.

In addition, the control circuit 6 produces the regulating signal SR2 with a value such that the converter 9 is blocked, that is that it does not operate and that its output presents a very high impedance.

When the vehicle equipped with the drive system 1 moves under these conditions, the control circuit 6 produces the signal SR1 with a value which depends on that of the signal SA, that is on the position of the accelerator pedal.

In response to this signal SR1, the converter 5 supplies a given electric energy to the motor 2 in the form of alternating voltage and current and the power absorbed by this motor 2 in electrical form and that which is returned by this latter in mechanical form depend on the value of this signal SR1 and thus on the position of the accelerator pedal of the vehicle.

The electric energy supplied by the converter 5 to the motor 2 obviously comes from the battery 4 which supplies this energy in the form of direct voltage and current.

It may thus be considered that a first electric energy flux circulates in this case from the battery 4 to the motor 2 through the converter 5, this latter regulating the intensity of this first energy flux as a function of the value of the regulating signal SR1 which in turn depends on the value of the signal SA and thus of the position of the accelerator pedal of the vehicle. This first electric energy flux is represented in FIG. 1 by the arrow F1 shown in broken lines between the battery 4 and the motor 2 and will be designated with the same reference numeral in the description that follows.

The amount of electric energy available in the battery 4 obviously decreases as the vehicle equipped with drive system 1 moves. The signal SQ, which is representative of this amount of energy therefore also decreases.

When this signal SQ reaches the value SQ1 mentioned hereinabove, that is when the amount of energy available in the battery 4 has only the value Q1 left, the control circuit 6 causes the starting up of the gasoline engine 7 and the operation of the converter 9.

The engine 7 may of course be started up by a conventional starter supplied by an auxiliary battery and controlled by a suitable signal supplied by the control circuit 6, but the presence of this auxiliary battery and of this starter makes this solution not very advantageous, and it has not been shown.

It is thus preferable to arrange the converter 9 so that it is able not only to produce a direct voltage from an alternating voltage supplied by the generator 8, as has been mentioned hereinabove, but that it is also able to function in the opposite direction, i.e. to supply the generator 8 with an alternating voltage from the direct voltage produced by the battery 4.

A reversible converter of this kind is well known to the man skilled in the art and will therefore not be described here. It will merely be admitted that, in the present example, the direction of operation of the converter 9 is determined by the polarity of the control signal SR2.

It will be seen that when the converter 9 is arranged in the manner described hereinabove, it suffices for the generator 8 to be of any of the various well known types of generators capable of also operating as motors for the gasoline engine 7 to be started up without any need to use an auxiliary starter and battery.

This type of solution has been adopted in system 1 of FIG. 1.

When the signal SQ reaches the value SQ1, as has been described hereinabove, the control circuit 6 thus gives the signal SR2 a polarity and a value such that the converter 9 operates in the direction in which it supplies an alternating voltage to the generator 8 from the direct voltage produced by the battery 4.

The generator 8 therefore operates as a motor and causes the gasoline engine 7 to rotate.

At the same time, the control circuit 6 gives the signal SR3 a value such that the fuel supply device of the engine 7 is able to operate.

This engine 7 thus starts and begins to cause the generator 8 to turn and this latter starts to produce an alternating voltage.

The control circuit 6 then changes the polarity of the signal SR2 so that the converter 9 begins to supply a direct voltage in response to the alternating voltage which it receives from the generator 8.

As has already been mentioned, the direct voltage produced by the converter 9 is substantially equal to the voltage at the terminals of the battery 4.

Moreover, as will be described in detail hereinbelow, the electric energy produced by the converter 9, which comes from that which is produced by the generator 8, is used on the one hand by the converter 5 to supply to the motor 2 the energy needed for its operation and, on the other hand, to recharge the battery 4.

It may therefore be considered that, in this case, a second electric energy flux circulates from the generator 8 to the motor 2 across the converters 9 and 5 and a third electric energy flux circulates from this generator 8 to the battery 4 across the converter 9.

These two electric energy fluxes are represented respectively in FIG. 1 by the arrows of broken lines F2 and F3 and will be designated by these same references in the description that follows.

It is clear that in this case the power transmitted to the motor 2 by the energy flux F2 is determined by the value of the signal SR1, exactly as in the case described hereinabove where the engine 7 does not operate and where any energy needed to propel the vehicle is supplied by the battery 4.

It is generally recommended that a battery be recharged with a current at least substantially equal to a constant current determined as a function of the type of this battery, of its maximum capacity and of the time permitted to recharge it, to ensure that it lasts as long as possible.

To recharge the battery 4 with this substantially constant and predetermined current it is therefore necessary for the power transmitted to this battery 4 by the energy flux F3 also to be substantially constant and predetermined.

This latter power is equal to the difference between the power supplied by the converter 9 and that which is absorbed by the converter 5, and it is thus proportional to the difference between the signal SR2 and the signal SP1, provided of course that the factors of proportionality between these signals and the corresponding powers are equal, which is not difficult to achieve.

The power absorbed by the converter 5 is obviously variable and the same therefore applies to the value of the signal SP1.

For the difference between the signals SP2 and SP1 to remain constant, it is therefore necessary to vary the power supplied by the converter 9, to which the signal SP2 is proportional, and thus to vary the power supplied by the generator 8.

This latter depends directly on the speed of rotation of this generator 8, and thus on that of the gasoline engine 7 which, in turn, depends on the mechanical power which this engine 7 has to supply and on the value of the signal SR3 which controls its fuel supply device.

For the power supplied to the battery 4 to be substantially constant, the control circuit 6 can therefore be arranged so that it regulates the power supplied by the generator 8 by regulating the speed of rotation of the engine 7 by means of the signal SR3, the value of this signal SR3 being determined as a function of the difference between signals SP2 and SP1.

For the power supplied to the battery 4 to be substantially constant, the control circuit 6 can also be arranged in such a way that it regulates the mechanical power which the engine 7 has to supply.

For a reason which will be made evident from the description that follows, the system 1 must in this case have, apart from the elements described hereinabove, a device producing a signal proportional to the speed of rotation of the engine 7 and/or of the generator 8.

The voltage produced by the generator 8 being proportional to its speed of rotation, a device of this kind can simply be composed of a measurement circuit of this voltage, the input of which is connected to the generator 8 and the output of which produces a signal proportional to this voltage and thus to the speed of rotation of the generator 8. In FIG. 1, this third measurement circuit has reference numeral 13 and the signal which it produces will be called signal SV.

Also in this case, the control circuit 6 is arranged so as to permanently calculate, from the value of the signal SP1 and taking into account the characteristics of the motor 7 and of the generator 8, a reference value for the signal SV, this reference value being equal to that of this signal SV when the speed of rotation of the generator 8 is such that the power which it supplies is exactly equal to the sum of the power absorbed by the converter 5 and of that which must be used to recharge the battery 4.

When the vehicle equipped with system 1 travels at a constant speed on perfectly horizontal ground, the power consumed by the motor 2, and thus that which is absorbed by the converter 5, are constant, as is also the value of the signal SP1.

Let us admit that the engine 7, and thus the generator 8, then turn at a speed such that the power produced by this latter is exactly equal to the sum of this power absorbed by the converter 5 and of that which it is desired to supply to the battery 4 to recharge it. The signal SV therefore has exactly the reference value calculated by the control circuit 6 and the system is in a stable state.

If now the power absorbed by the converter 5 increases, for example because the driver of the vehicle wishes to accelerate, the signal SP1 also increases.

The control circuit 6 then calculates, from this new value of the signal SP1, a new reference value for the signal SV higher that the preceding reference value. The difference between this new reference value and the value of the signal SV thus becomes positive because, at least at the first instant, the speed of rotation of the generator 8 remains unchanged.

In response to this difference between the new reference value and that of the signal SV, the control circuit 6 gives a new value to the signal SR2 such that the power supplied by the converter 9 and thus that which the generator 8 has to produce, decreases.

The power supplied by the converter 9 having decreased whereas that which is absorbed by the converter 5 has increased, the difference between these two powers decreases or even becomes negative.

In the first case, the charge of the battery 4 is not interrupted, but simply slowed down. In the second case, this charge is interrupted, and the battery 4 supplies to the converter 5 that portion of the power which is absorbed by this latter and which the converter 9 no longer supplies thereto.

The decrease in the power produced by the generator 8 results in the resisting torque opposed by this latter to the engine 7 also decreasing. As a result, the speed of rotation of this engine 7 increases, as well, of course, as that of the generator 8.

The signal SV thus also increases and, when it becomes greater than the new reference value mentioned hereinabove, the control circuit 6 again modifies the signal SR2 and gives it a value such that the converter 9 again supplies all the power absorbed by the converter 5 and the power needed to charge the battery 4.

The power which the generator 8 has to supply therefore increases, as does the resisting torque it opposes to the engine 7. The speed of rotation of this engine 7, and thus of the generator 8, decreases again, as does of course the value of the signal SV. However, as soon as this value of the signal SV falls below its new reference value, the control circuit 6 changes the value of the signal SR2 so that the power supplied by the converter 9 decreases, which results in the speed of rotation of the generator 8 increasing again, and so on.

In analogous manner, the reference value for the signal SV calculated by the control circuit 6 decreases when the power absorbed by the converter 9 decreases. The difference between this new reference value and the signal SV therefore becomes negative and in response to this negative difference the control circuit 6 gives the signal SR2 a value such that the power supplied by the converter 9 increases.

As a result of this increase, on the one hand the power supplied to the battery 4 increases and, on the other hand, the speed of rotation of the generator 8 decreases until the signal SV becomes less than its new reference value.

The control circuit 6 then again modifies the signal SR2 so that the power supplied by the converter 9 decreases and again becomes equal to the sum of the power absorbed by the converter 5 and of that which is needed to charge the battery 4.

The speed of rotation of the generator 8 then increases again, and so on.

It will be seen that as long as the power absorbed by the converter 5 is constant, the speed of rotation of the generator 8 oscillates about a mean value which is that for which the signal SV is equal to the reference value calculated by the control circuit 6, that is for which the power supplied by the converter 9 is equal to the sum of the power absorbed by the converter 5 and of that which is needed to recharge the battery 4. The amplitude and the frequency of these oscillations of the speed of rotation of the generator 8 can be maintained at low values by suitable choice of the characteristics of the various elements concerned. Moreover, when the power absorbed by the converter 5 varies, the speed of rotation of the generator 8 is consequently regulated and, during the time needed for this regulation, the battery 4 supplies, if necessary, the power which the converter 5 absorbs and which the generator 8 no longer supplies, or absorbs that which this generator 8 supplies and which the converter 5 no longer absorbs.

It may be seen that when the control circuit 6 is arranged so as to carry out the method just described, the speed of rotation of the generator 8 is regulated to the desired value without need to change the value of the signal SR3 which controls the fuel feeding device of the engine 7.

This signal SR3 can therefore have a constant value chosen in such a way that this engine 7 operates in the most favourable conditions, i.e. that it consumes as little fuel as possible and/or that it produces as few pollutant gases as possible.

Thus, for example, in the case in which the fuel feeding device of the engine 7 has a carburettor with a throttle valve, the position of which is controlled by the signal SR3, it is possible, and even preferable, to give this signal SR3 a constant value so that this throttle valve is always completely open.

When the system 1 operates as has just been described, the amount of electric energy available in the battery 4 increases and, after some time, reaches a predetermined value Q2, the signal SQ then taking a value SQ2.

In response to this value SQ2 of this signal SQ, the control circuit 6 stops the engine 7 by, for example, giving the signal SR3 a value such that the fuel supply of this engine 7 is completely interrupted. At the same time the control circuit 6 blocks the converter 9 by giving the signal SR2 a value such that this converter 9 no longer functions and that its output has a very high impedance.

As from this moment, all the energy needed to move the vehicle is once again supplied by the battery 4. The amount of electric energy available in this latter then decreases until it reaches the value Q1. The control circuit 6 then causes the engine 7 to start up again and unblocks the converter 9, and the system 1 starts functioning again as described hereinabove.

As clearly emerges from the preceding description, the intensities of the various electric energy fluxes which have been defined hereinabove and which circulate between the elements of the system 1 producing or absorbing such energy, that is the battery 4, the motor 2 and the generator 8, are regulated by the converters 5 and 9 which thus together constitute means for transferring this energy between these elements. The converter 5 regulates the intensity of the first and of the second of these fluxes as a function of the signal SR1 which in turn depends on the signal SA and thus on the position of the accelerator pedal of the vehicle. This converter 5 thus constitutes a means for regulating the speed of the vehicle. The converter 9 regulates the intensity of the sum of the second and of the third of these fluxes as a function of the signal SR2 and thus constitutes a means of regulating the charge of the battery 4.

Moreover, the fact that the vehicle drive system of the instant invention has a converter such as the converter 9 which is capable of regulating the amount of energy supplied by the generator driven by the gasoline engine (the generator 8 and the engine 7 in the example of FIG. 1) gives this system numerous advantages compared to known systems such as that described in U.S. Pat. No. 4,306,156 mentioned hereinabove.

Among these advantages one should mention the fact that, regardless of the method chosen, the battery of the system (the battery 4 in the example described) can be recharged under favourable conditions, which prolongs its life, and without need for providing a resistance of limitation of the current used for this recharging, which substantially increases the efficiency of the system and thus increases the automomy of the vehicle, that is the distance which it can cover before it becomes necessary to refill its fuel tank.

Moreover, the conditions of operation of the gasoline engine (the engine 7 in the example described) can be chosen in optimum manner, which further increases the efficiency of the system and reduces the amount of pollutant gas emitted by this engine. In addition, the generator coupled to the gasoline engine can be of the type of those which produce an alternating voltage, which are less voluminous, lighter and cheaper, for equal performance, than those which produce a direct voltage. Moreover, the connection between the gasoline engine and the generator can be arranged in such a way that this latter turns at high speed, which makes it possible to reduce its size and hence its price.

It is clear that the values Q1 and Q2, between which the amount of electric energy available in the battery 4 varies, can be very freely chosen, notably as a function of the type of battery 4.

Thus, in cases in which the battery 4 is a lead accumulator, one would preferably choose for Q1 a value situated between 20% and 30% approximately of the maximum amount of electric energy that the battery 4 can contain, so as to avoid the damage which a battery of this type could suffer when it is discharged until the amount of electric energy still available is below this value.

Also by way of example, it is possible to choose for Q2 a value close to the maximum amount of electric energy that the battery 4 can contain. However it is known that the charging efficiency of a battery decreases when the amount of energy contained therein approaches this maximum quantity. It is thus preferable to choose for Q2 a value below this maximum quantity, for example a value of the order of 70% to 80% of this latter, for which the charging efficiency is still sufficiently high. Such a choice further increases the autonomy of the vehicle.

This autonomy of the vehicle can be further increased by arranging the system 1 in such a way that when its driver completely releases the accelerator pedal, at least part of the kinetic energy of the vehicle is converted into electric energy and that at least part of this latter is used to recharge the battery 4.

A system 1 arrranged in this manner will not be described in detail since its realization does not pose any particular problem to the person skilled in the art.

It will merely be mentioned that, in a system of this type, the motor 2 must clearly be one of the various well known types of motors capable of operating as generators. In addition, the converter 5 must also be capable of functioning in an opposite direction to that which has been described hereinabove, that is that it must be capable of producing direct voltage and current from the alternating voltage and current supplied by the motor 2 when this latter functions as a generator.

In addition, the control circuit 6 must be arranged so as to give the signal SR1 a value and/or a polarity such that the converter 5 operates in the second manner mentioned hereinabove when the signal SA takes the value which indicates that the driver of the vehicle has totally released the accelerator pedal thereof.

However, the control circuit 6 must also be arranged in such a way that, in this case, the amount of electric energy contained in the battery 4 does not exceed its admissible maximum value and that the electric power supplied by the converter 5 to this battery 4 is never higher than that which the latter can absorb without damage.

To fulfil these conditions, the control circuit 6 can be arranged in various ways.

Thus, for example, the control circuit 6 can be arranged so as to give the signal SR1 a value such that the electric power supplied by the converter 5, which is indicated by the signal SP1, is at most equal to that which the battery 4 can absorb in the event that the signal SQ indicates that this battery 4 is not completely charged, and a value such that the converter 5 is blocked in the contrary case.

Also by way of example, the control circuit 6 can also be arranged so that the signal SR1 always has the value for which the converter 5 transmits all the electric power supplied by the motor 2 when this operates as a generator, regardless of this power. This control circuit 6 is then also arranged so that, if the signal SP1 and/or the signal SQ indicate that this power is greater than that which the battery 4 can absorb, it gives the signal SR2 the polarity for which the converter 9 operates in the direction in which it supplies electric power to the generator 8, and to the signal SR3 the value for which the fuel supply to the engine 7 is interrupted. This engine 7 is then set in rotation by the generator 8, which functions as a motor, and dissipates the electric power absorbed by the converter 9 in the form of heat. The control circuit 6 is of course in this case so arranged that the value of the signal SR2 is such that this electric power absorbed by the converter 9 is equal to the difference between that which is supplied by the converter 5, which is indicated by the value of the signal SP1, and that which the battery 4 can absorb.

Since this conversion of at least part of the kinetic energy of the vehicle into electric energy has the effect of braking the latter, a system 1 of this type also has the advantage of reducing wear of the conventional braking device of the vehicle, said device being needed in any case, if only for obvious reasons of safety.

In another embodiment of the drive system of the instant invention, which is also shown in FIG. 1, the control circuit 6 is arranged so that the value of Q1 and/or the value of Q2 are different, depending on the value of a mode selection signal SM supplied by a two-position switch disposed on the dashboard of the vehicle. The connection between this switch, which has not been shown, and the control circuit 6 is represented in FIG. 1 by the broken line also designated with the reference SM.

Then, when the signal SM has a first value, which corresponds to the first position of the switch, the values of Q1 and Q2 can differ quite greatly from one another, for example can be equal to 20% and 80% respectively of the maximum amount of energy which the battery 4 can contain.

In this first mode of operation, the vehicle can therefore run a relatively large distance without putting the gasoline engine into operation, which for example makes it possible to cross a built-up area without emitting pollutant gas.

In addition, when the signal SM has a second value, that is when the switch is in its second position, the values of Q1 and Q2 can be relatively close to one another, for example can be equal to 40% and 60% respectively of the maximum amount of energy which the battery 4 can contain.

In this second mode of operation the gasoline engine is put into operation at shorter intervals than in the first mode of operation, but the efficiency of the system is improved by the fact that the charging efficiency of the battery is higher and the lifetime of this latter is extended. This second mode of operation is advantageously used when the vehicle is driven in the open country.

In a variant of this second embodiment of the system of the invention, the switch supplying the signal SM can adopt one or several different positions apart from those mentioned hereinabove, this signal SM then having a different value for each of the positions of this switch. In addition, the control circuit 6 is arranged so that the value of and/or the value of Q2 are different for each of the values of the signal SM.

Thus, for example, the values of Q1 and of Q2 can be those which have been mentioned hereinabove for two of the values of the signal SM and, for a third value of this signal SM, can be equal to 70% and 90% respectively of the maximum amount of energy that the battery 4 can contain.

This third mode of operation can advantageously be used when the vehicle is driven in the open country and when its driver knows that he must then drive through a built-up area. When the vehicle arrives at the entrance to the built-up area, the amount of energy available in the battery 4 will at least be equal to 70% of the maximum amount of energy that it can contain. This amount of available energy will thus probably be sufficient for the vehicle to be able to cross this built-up area while functioning according to the first mode described hereinabove, without the gasoline engine being put into operation.

It is clear that other modifications and/or additions can be made to the drive system of a vehicle described hereinabove without departing from the scope of the instant invention.

Thus, notably, the gasoline engine 7 of the system 1 of FIG. 1 can be replaced by any other type of internal combustion engine, that is by any other engine using the combustion of a fuel to produce mechanical energy such as, for example, a gas turbine.

Likewise, it is evident that the system of the instant invention can be used in a vehicle having several drive wheels. In such a case, each pair of drive wheels, or even each of these, can be driven by a single motor such as the motor 2 of FIG. 1, via the intermediary of well known mechanical transmission means, or each drive wheel can be driven by a separate motor.

What is claimed is:

1. A drive system for a vehicle having at least one drive wheel and means for producing a signal for controlling the speed of rotation of said drive wheel, having:
   an electric motor mechanically coupled to said drive wheel;
   a rechargeable electric energy accumulator;
   an internal combustion engine;

an electric energy generator mechanically coupled to said internal combustion engine;

electric energy transfer means electrically connected to said electric motor, to said generator and to said accumulator to cause a first electric energy flux to pass between said accumulator and said electric motor, a second electric energy flux to pass between said generator and said electric motor, and a third electric energy flux to pass between said generator and said accumulator; and means to produce a first measurement signal representative of the amount of electric energy stored in said accumulator;

wherein said electric energy transfer means have:

first regulating means to regulate the intensity of said first and of said second electric energy flux in response to a first regulating signal; and second regulating means to regulate the intensity of said second and of said third electric energy flux in response to a second regulating signal;

and wherein said system also has:

means to produce a second measurement signal representative of the electric power transmitted by said first and said second electric energy flux;

means to produce a third measurement signal representative of the electric power transmitted by said second and said third electric energy flux; and a control circuit arranged so as to produce said first regulating signal as a function of said speed controlling signal and to produce said second regulating signal as a function of the difference between said third and said second measurement signal.

2. A drive system according to claim 1, wherein said control circuit is arranged so as to produce said second regulating signal with a value such that said difference between said third and said second measurement signal is at least substantially equal to a determined value.

3. A drive system according to claim 2, also having means to produce a fourth measurement signal representative of the speed of rotation of said generator, and wherein said control circuit is arranged so as to:

calculate a reference value for said fourth measurement signal as a function of said second measurement signal;

firstly give said second regulating signal a value such that said intensity of the second and of the third electric energy flux decreases or increases depending on whether said difference between said third and said second measurement signal decreases or, respectively, increases; and when said fourth measurement signal reaches said reference value, give said second regulating signal a value such that said difference between said third and said second measurement signal is again equal to said determined value.

* * * * *